Feb. 21, 1939.  G. H. PFEFFERLE  2,148,036
STANDARD ADAPTER JOINT FOR CONNECTING TUBING
Filed Aug. 3, 1937
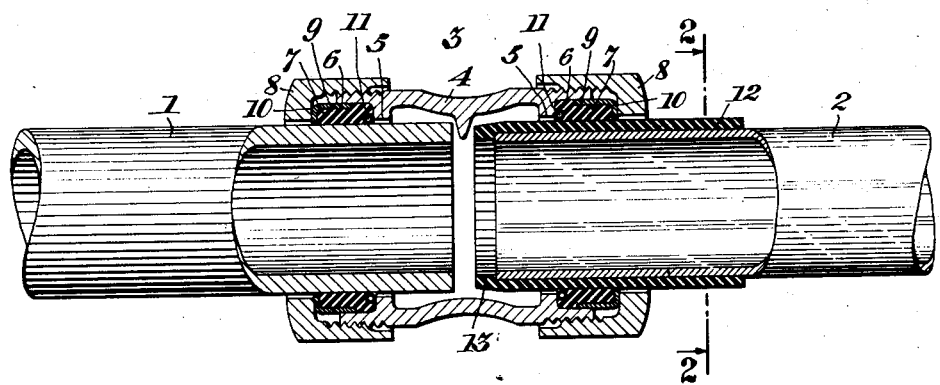
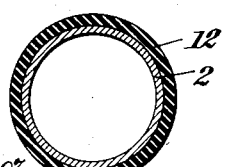
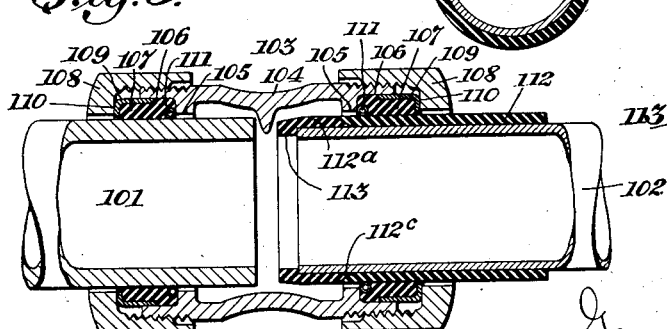

Patented Feb. 21, 1939

2,148,036

UNITED STATES PATENT OFFICE 2,148,036

STANDARD ADAPTER JOINT FOR CONNECTING TUBING

George H. Pfefferle, Bradford, Pa., assignor to S. R. Dresser Manufacturing Company, Bradford, Pa., a corporation of Pennsylvania Application August 3, 1937, Serial No. 157,090

3 Claims. (Cl. 285—196)

My invention consists in the novel features hereinafter described, reference being made to the accompanying drawing, which illustrates one embodiment of my invention selected by me for purposes of illustration, and said invention is fully disclosed in the following description and claims.

The recent use of copper tubing for underground service line work, and particularly where service lines of iron or steel pipe are renewed by pulling copper tubing through the old lines with the consequent necessity for connecting the copper tubing with iron or steel pipe has presented a new problem in pipe joints. As copper is much more expensive than iron or steel, copper tubing is made with a very much thinner wall than the iron or steel pipe, so that the copper tubing of any particular internal diameter has a very much smaller external diameter than iron or steel pipe of the same internal diameter. It is also impossible to use threaded connecting means in connection with copper tubing since the extremely thin wall will not permit of the cutting of threads therein. It is also desirable to connect copper tubing by means of coupling parts formed of iron or steel from the standpoint of economy and commercial practicability. Furthermore, as is well known, the use of dissimilar metals at or near a joint of this character is likely to set up electrolytic cell action which would result in the destruction of disintegration of the iron or copper parts to a greater or lesser extent.

Prior to my invention, it was found that it would be necessary to use soldered or brazed fittings at the junctions between iron pipe and copper tubing, and also that it would be necessary to give the metal parts a protective coating for a distance of at least three feet on each side of such joints. Even if it were not for the electrolytic cell action, the difference in external diameters of the iron or steel pipes and the copper tubing of the same diameter, would have made it necessary to provide special reducer couplings for all the different sizes of iron pipe which would have to be especially manufactured and carried in stock by the manufacturer and the trade, involving great expense and inconvenience.

Couplings and fittings for connecting iron or steel pipes of the same diameter and having plain or unthreaded ends have been developed and are available commercially, but these standard couplings and fittings could not be utilized for connecting iron and copper pipes on account of the differences of external diameter and the danger of electrolytic cell action.

As a result of study and experiment, I have found it possible by my present invention to overcome all these difficulties and to produce a joint between iron pipe and copper pipe of the same internal diameter by the use of a standard coupling, and without the possibility of setting up electrolytic cell action.

In the accompanying drawing:

Figure 1 represents a sectional view illustrating my improved pipe joint, portions of the iron pipe and copper tubing being shown in elevation.

Figure 2 is a transverse section on line 2—2 of Figure 1.

Figure 3 is a partial sectional view similar to Figure 1, showing a modification.

Figure 4 is an enlarged partial section of the sleeve shown in Figure 3.

In Figures 1 and 2 of the drawing, 1 represents an iron or steel pipe of any standard size, say one inch, having a plain unthreaded end. 2 represents a section of copper tubing of one inch internal diameter, but having an external diameter materially less than that of the pipe 1. 3 represents a standard coupling, preferably of iron or steel, for one inch iron or steel pipe, comprising among its members a coupling sleeve 4 provided at each end with a pipe aperture indicated at 5, 5, of a size adapted to fit over a standard one inch iron or steel pipe, and also provided with a packing recess 6 at each end of greater diameter than the pipe apertures. 7, 7, represent standard, annular packing members, preferably formed of rubber or rubber composition, adapted to fit the packing recesses and having each an internal diameter adapted to fit upon the exterior of a one inch iron or steel pipe. 8, 8, represent clamping members for engaging and compressing the packing members 7, 7, and having pipe apertures to fit over a standard one inch iron or steel pipe, means being provided for forcing the clamping members in a direction toward the central portion of the sleeve 4, in any desired way, as by bolts or screw threaded engagement with the end portions of the sleeve. In this instance, I have shown the sleeve 4 provided at its opposite ends with exterior threaded portions and the clamping members 8 are provided with cylindrical portions interiorly threaded and engaging the threaded ends of the sleeve 4. Each of the packing members 7 is provided, in this instance, with a metal sleeve 9 fitting over the outer portion of the packing member and adapted to slide within the packing recess, and having an inwardly extending flange 10 engaging the outer end of the packing member and adapted to be engaged by the clamping member 8. Each packing member 7, is also provided in this instance adjacent to the pipe aperture 5 with a tightly coiled annular metal helix 11 molded therein to prevent extrusion of the packing member through the pipe aperture. It will be seen that by reason of the smaller external diameter of the copper tubing 2, the packing member 7 surrounding the same, would be entirely too large to form a tight joint with the outer surface of the copper tubing. I, therefore, insert between the exterior of the copper tubing 2 and the interior surface of the standard packing member 7 surrounding the same, a reducing and insulating sleeve 12, of sufficient thickness of wall to compensate for the difference in external diameters between the standard iron or steel pipe 1 and the copper tubing 2, of the same internal diameter. This sleeve is also made preferably of rubber or rubber composition, and is preferably of considerable length so as to extend into the sleeve 4 beyond the inner end of the copper tube 2, and some distance beyond the adjacent clamping member 8. The inner end of the insulating and reducing sleeve 12 is also provided with a portion 13 of slightly less internal diameter than the other portions of the insulating and reducing sleeve 12 forming an annular stop to engage the inner end of the copper tube 2, and prevent it from touching the iron or steel pipe 1 or any part of the coupling which is also preferably formed of iron or steel.

The additional thickness of the insulating or reducing sleeve 12 to the wall thickness of the copper tube 2, will enable the latter to be inserted fittingly within either end of the standard coupling 3, the iron or steel pipe 1 being inserted in the opposite end. When the clamping members 8 are tightened, one of the packing members 7 will be tightly compressed within its packing recess and in sealing relation thereto, and will have its inner cylindrical face pressed into sealing engagement with the outer surface of the iron pipe 1, while the other packing member 7 will be simultaneously compressed so as to force its inner surface into sealing engagement with the reducing and insulating sleeve 12 over which it can slide freely as it is compressed longitudinally, and the compression of the packing member or gasket will simultaneously force the within portions of the reducing and insulating sleeve 12 into sealing engagement with the exterior surface of the copper tube 2, thus holding the dissimilar metals of the iron or steel pipe 1 and coupling 4, and the copper tube 2 against any possible contact and entirely obviating the possibility of any electrolytic cell action being produced. A gas and liquid tight joint is thus effected by a standard pipe fitting or coupling between two pipes of different metals and different exterior diameters. This obviates the necessity of providing specially constructed coupling parts and carrying them in stock in all the required sizes, and specially treating the joints or parts thereof, and makes it commercially practicable to employ copper tubing wherever it may be or become desirable, and to readily connect it with adjacent pipe sections of iron or steel, or other different metals.

It will be understood that the standard coupling for iron or steel pipe of any standard internal diameter can also be employed to connect two sections of copper tubing of the same standard internal diameter, but smaller external diameter, by providing each section of the copper tubing with a reducing and insulating sleeve 12, thereby preventing electrolytic cell action between each copper tube and the iron or steel coupling or fitting 3, but my invention finds its greatest use in connecting iron or steel pipe sections with copper tubing of the same internal diameter, but of materially less external diameter.

I also wish it to be understood that the coupling sleeve 4 may be in the form of an L or T, or cross, instead of having a straight axis as shown in the drawing.

Wherever pipe lines, particularly those of small diameter, collect drip oil, or carry other liquid which is a solvent of rubber or which attacks rubber or rubber composition, the end of the reducing and insulating sleeve would be injuriously affected, and in some instances, might swell in such a manner as to obstruct to a greater or less extent the passage within the connected pipes. I, therefore, prefer in such cases to employ a reducing and insulating sleeve provided with an inner end portion or tip formed of a material which is both an insulating material and is also unaffected by drip oil or other liquid within the pipe line. The material which I prefer to employ for this purpose is a synthetic resin, such as Bakelite for example. I also prefer to unite the liquid resisting and insulating tip to the main body of the reducing and insulating sleeve. As rubber and synthetic resin, as Bakelite, are not easily connected, I prefer to form the protecting liquid resistant tip of jute or canvas or other fibrous material impregnated with uncured synthetic resin. This permits the fibrous material of the tip to become intermingled with the rubber and when the whole sleeve is vulcanized an effective bond between the body of the sleeve and the tip is produced.

In Figures 3 and 4, in which the parts corresponding with those shown in Figures 1 and 2 are indicated by the same numbers with the addition of 100, I have indicated the main body of the reducing and insulating sleeve at 112, and the inner end portion or tip at 112ª formed of Bakelite with jute or canvas or other fibrous material or fabric indicated at 112ᵇ in Figure 4, incorporated therein. The adjoining ends of the sleeve and tip are preferably made inclined to the axis of the sleeve as at 112ᶜ, one being conical or tapered and fitting the end of the other so as to give greater surface contact than a butted engagement, and the tip is provided at its inner end with the annular stop portion 113. The entire sleeve is preferably vulcanized in a suitable mold, thus causing the tip and main body to unite, through the intervention of the fibrous material or fabric into a unitary structure.

It will be understood that as indicated in Figure 3, the packing member gasket 107, will surround the main body of the sleeve 112, and will not engage the tip 112ª, so as to compress the rubber portion of the sleeve, over which this is free to slide as it is longitudinally compressed, into engagement with the copper tube 102.

It will be understood that the liquid resisting tip 112ª may be made entirely separate from the sleeve 112 and slipped over the end of the copper tube after the compressible sleeve portion 112, which is preferably formed of rubber or rubber composition. The tip 112ª may in such case be made of synthetic resin, as Bakelite, with or without fibrous material or fabric incorporated therein. The tip 112ª can be formed of any other material which will accomplish the same purpose or the sleeve 112 may be protected against deterioration by drip oil or other liquid contents of the pipe, in any other desired manner.

While I have shown in the drawing a coupling member provided at each of its ends with a compressible packing ring and means for compressing it, and adapted particularly for the connection of plain end, that is to say, unthreaded pipe sections, it is to be understood that my invention will be equally satisfactory for the connecting of a copper tube with a standard iron pipe which is provided with a threaded end, as a threaded pipe can be inserted in one end of the coupling member shown and sealed with respect to the coupling member, as efficiently as if it were not threaded. My invention is equally applicable to the standard type of coupling members for coupling iron pipes of the same standard size, one of which is threaded and the other plain or unthreaded, and in which one terminal portion of the coupling member is internally threaded to receive the threaded end of a standard iron pipe, while another terminal portion is provided with the packing recess, packing ring, and clamping means, previously described.

In the following claims where I have used the word "iron", it will be understood that either iron or steel is designated.

What I claim and desire to secure by Letters Patent is:

1. A pipe joint adapted to connect iron pipe with copper tubing of less external diameter, comprising a standard iron coupling member having a terminal portion provided with a pipe aperture, a packing recess, a sealing gasket, and a clamping member therefor adapted to receive a standard iron pipe, and a copper tube provided with a reducing sleeve of insulating material of a thickness substantially equal to the difference in exterior diameter between a standard iron pipe and the copper tube, inserted within the pipe aperture and sealing gasket, the tightening of the clamping member, effecting the sealing of the gasket with respect to the said sleeve and the sealing of the said sleeve with respect to the copper tube, and said sleeve preventing electrolytic cell action.

2. A pipe joint adapted to connect iron pipe with copper tubing of less external diameter, comprising a standard iron coupling member having a terminal portion provided with a pipe aperture, a packing recess, a sealing gasket therein and a clamping member therefor, adapted to receive a standard iron pipe, a copper tube extending through said pipe aperture and gasket, a reducing and insulating sleeve of a thickness substantially equal to the difference in exterior diameter of a standard pipe and the copper tube, interposed between the copper tube and said gasket, and provided at its inner end with means for protecting said sleeve from the injurious effects of liquid within the pipe line, the tightening of said clamping member serving to force said gasket into sealing engagement with the said sleeve, and said sleeve preventing electrolytic cell action.

3. A pipe joint adapted to connect plain end iron pipe with copper tubing of less external diameter, comprising a standard iron coupling member having a terminal portion provided with a pipe aperture, a packing recess, a sealing gasket therein and a clamping member therefor, adapted to receive a standard plain end pipe, a copper tube extending through said pipe aperture and gasket, a reducing and insulating sleeve of a thickness substantially equal to the difference in exterior diameter of a standard pipe and the copper tube, interposed between the copper tube and said gasket, and provided at its inner end with a cylindrical tip of material comprising synthetic resin, said tip being of substantially the same thickness as said sleeve, and located out of alignment transversely with the gasket, and being united integrally with said sleeve, and said gasket being capable of movement longitudinally of said sleeve, the tightening of the clamping member serving to force said gasket into sealing engagement with said sleeve, and said sleeve into sealing engagement with said copper tube, and said sleeve preventing electrolytic cell action.

GEORGE H. PFEFFERLE.